United States Patent [19]

Bardo et al.

[11] 4,422,983

[45] Dec. 27, 1983

[54] FIBERGLASS REINFORCED COOLING TOWER

[75] Inventors: Charles J. Bardo, Arlington; Andrew Green, Galveston, both of Tex.

[73] Assignee: Ceramic Cooling Tower Company, Fort Worth, Tex.

[21] Appl. No.: 388,906

[22] Filed: Jun. 16, 1982

[51] Int. Cl.³ .............................................. B01F 3/04
[52] U.S. Cl. ............................ 261/24; 261/DIG. 11; 261/111; 52/275; 52/309.1
[58] Field of Search .................. 261/DIG. 11, 111, 24; 52/309.1, 309.2, 275, 276, 279; 312/263, 100, 257 SM; 220/4 F

[56] References Cited

U.S. PATENT DOCUMENTS

| | | | |
|---|---|---|---|
| 744,405 | 11/1903 | Reno | 312/263 |
| 1,860,940 | 5/1932 | Morin | 220/4 F |
| 3,286,999 | 11/1966 | Takeda | 261/DIG. 11 |
| 3,384,165 | 5/1968 | Mathews | 261/DIG. 11 |
| 3,623,784 | 11/1971 | Neufeld | 52/275 |
| 3,739,556 | 6/1973 | Waters | 261/DIG. 11 |
| 4,330,491 | 5/1982 | Doshi et al. | 261/DIG. 11 |
| 4,382,046 | 5/1983 | Frohwerk | 261/DIG. 11 |

FOREIGN PATENT DOCUMENTS 2307244 5/1976 Fed. Rep. of Germany ... 261/DIG. 11

*Primary Examiner*—Tim R. Miles

[57] ABSTRACT

A liquid cooling tower is formed from fiberglass reinforced polyester resin panels, a fiberglass reinforced polyester resin liquid basin, and a fiberglass reinforced polyester resin top assembly which includes a fan and a water distribution pipe. One or more cross beams extend between two opposed side panels for supporting a porous heat and mass transfer section. The panels are formed so that the weight of the tower and the fill material is distributed to, and supported by, the corners and inlet columns of the tower.

32 Claims, 49 Drawing Figures

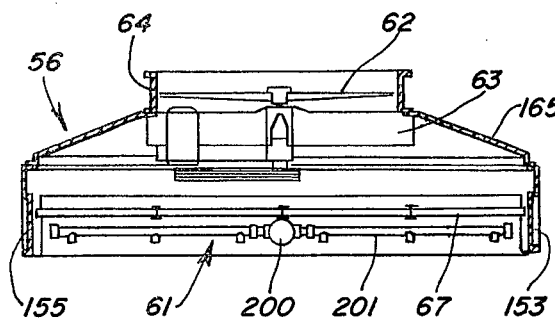
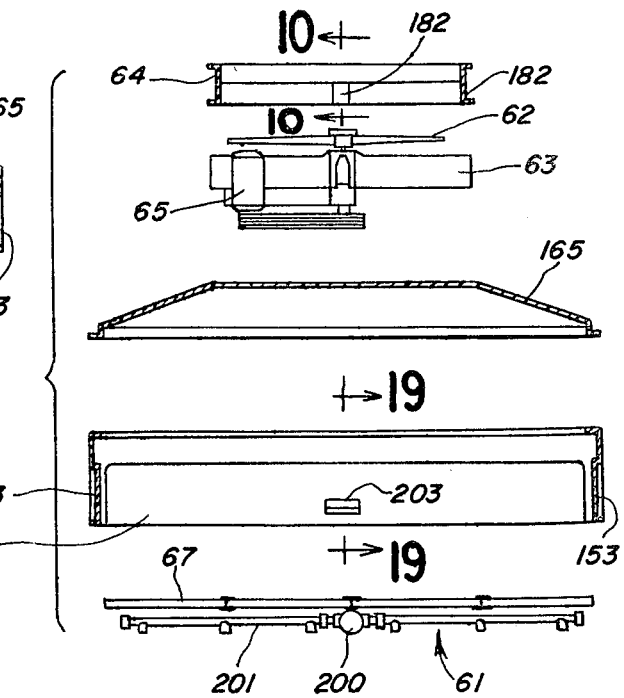
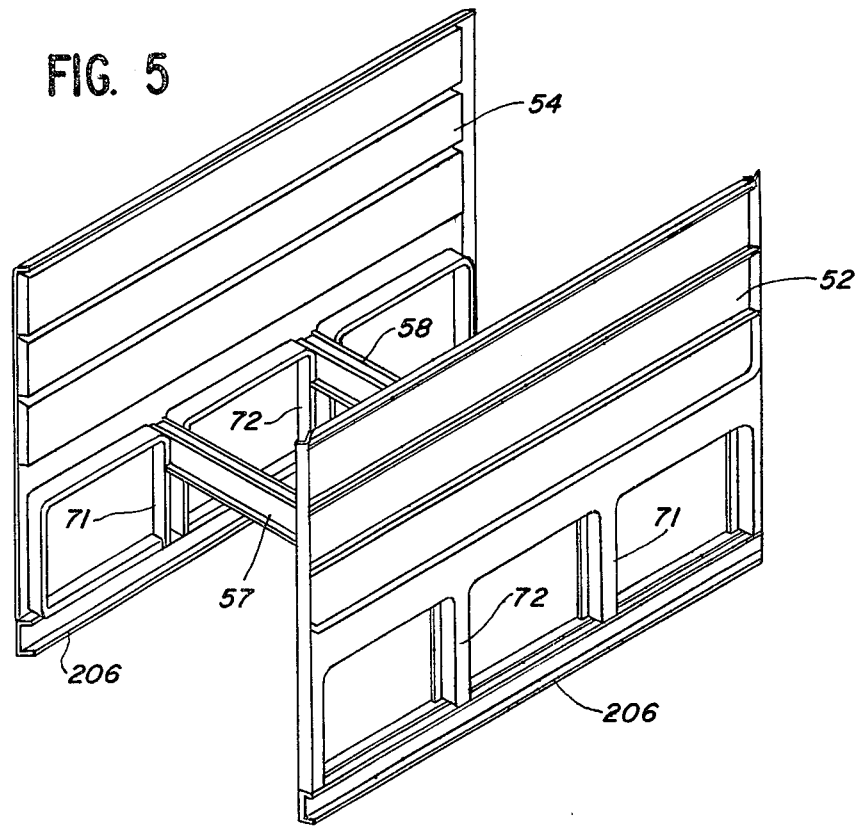

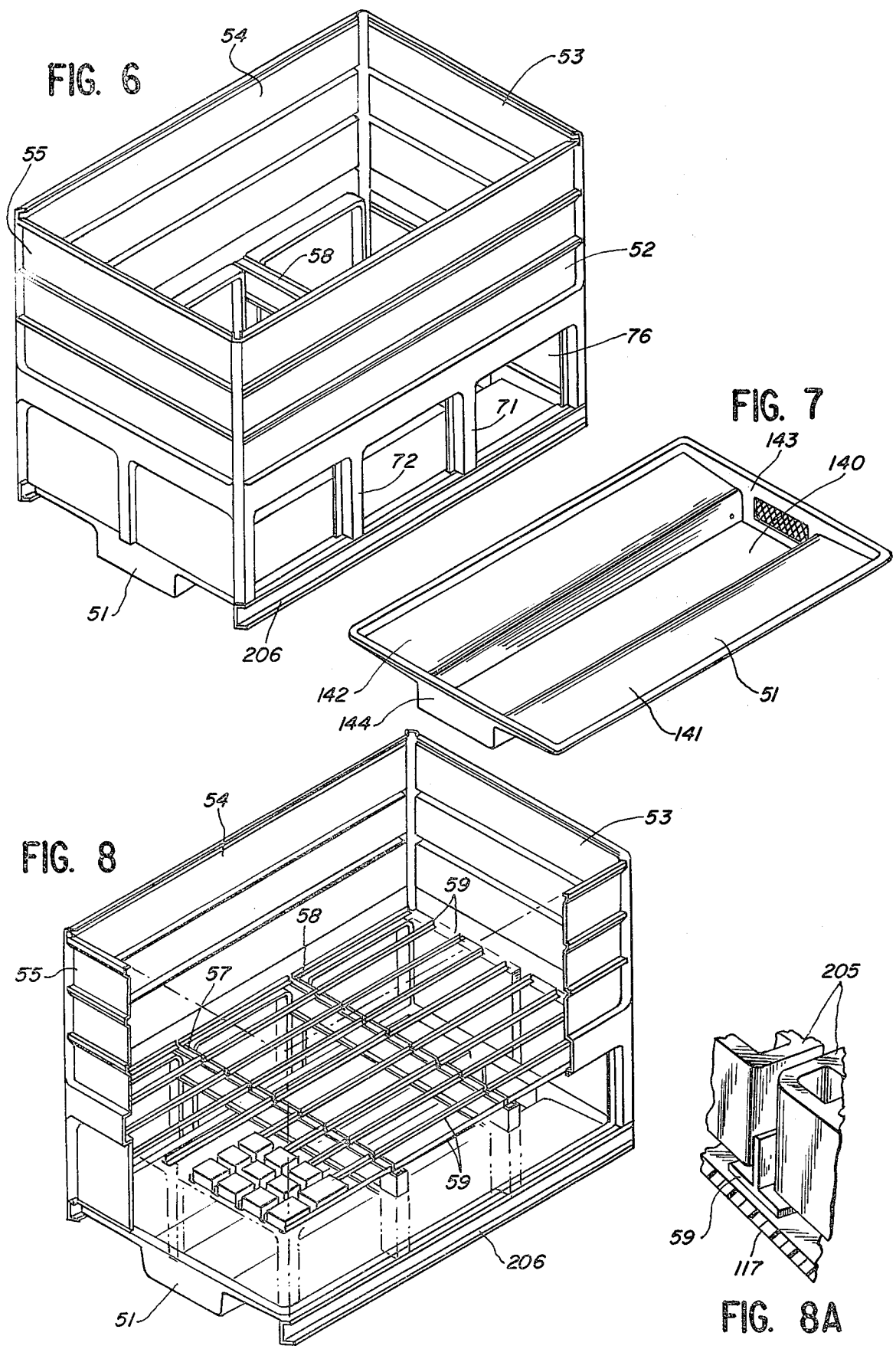

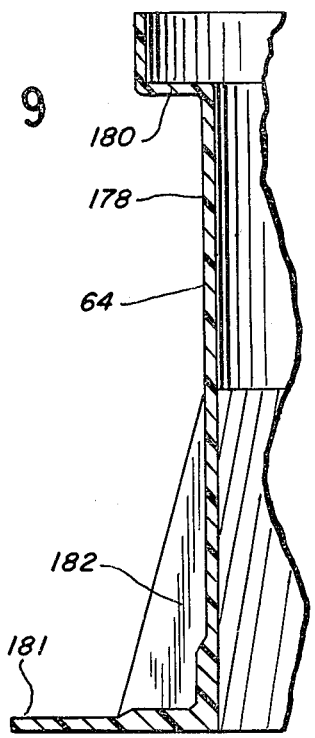
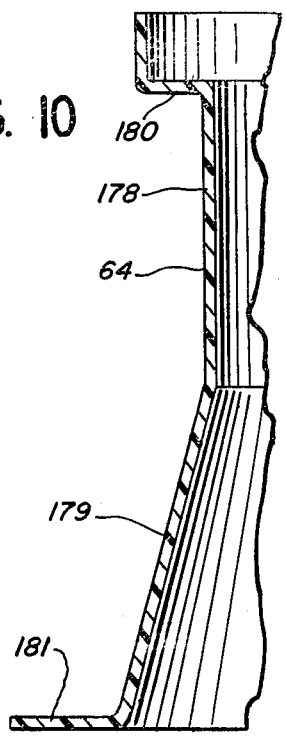
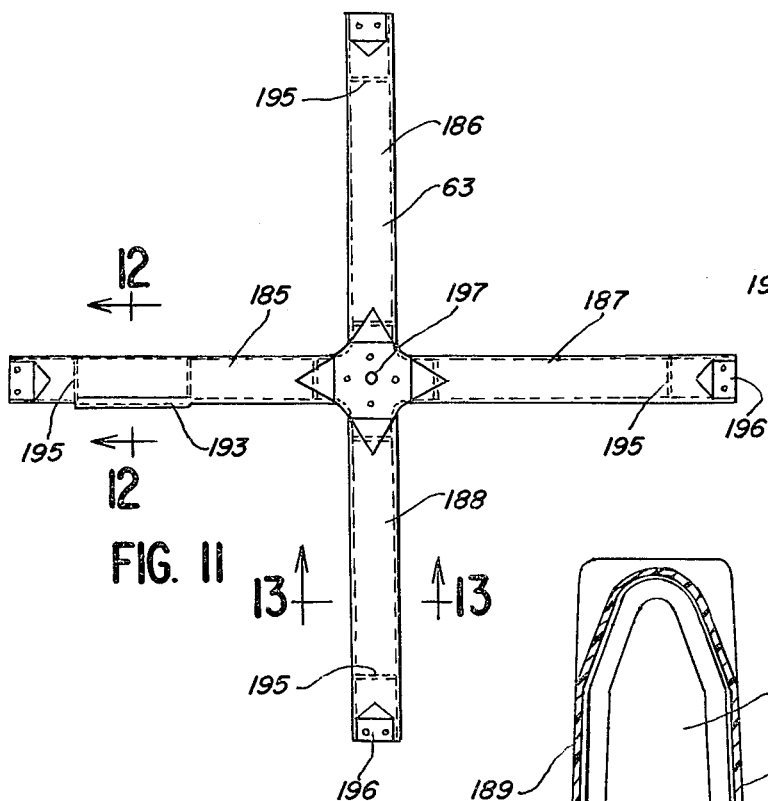
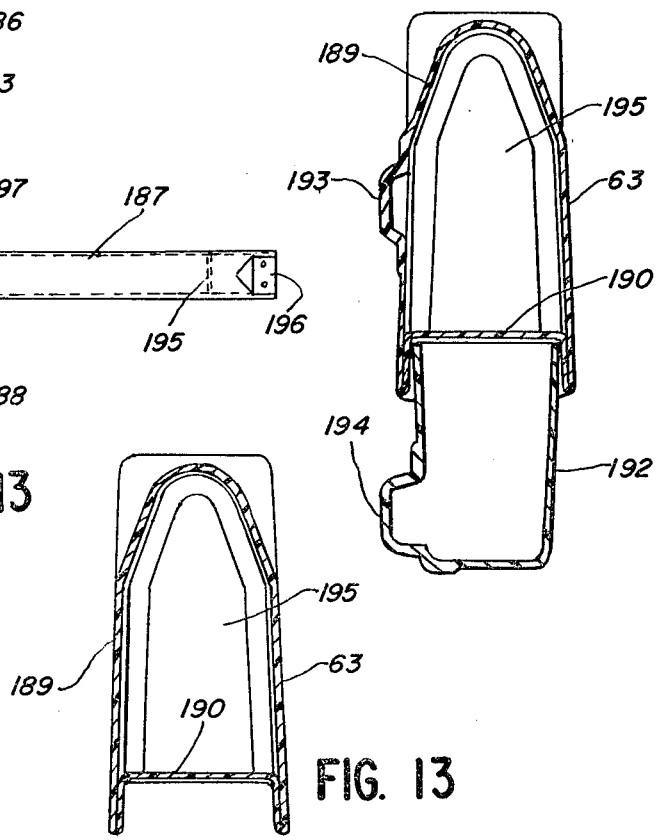

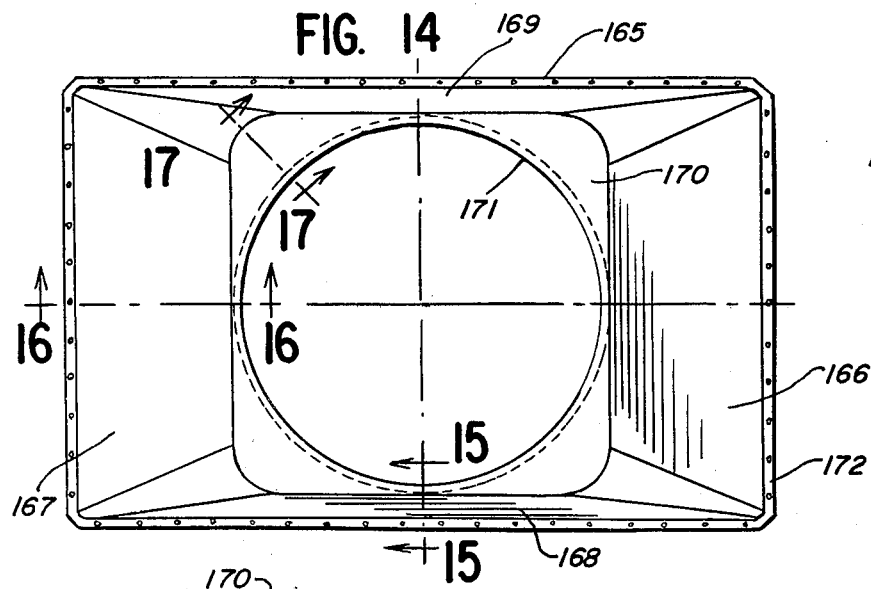
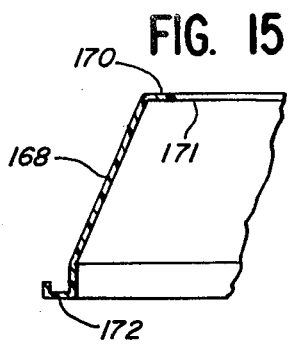
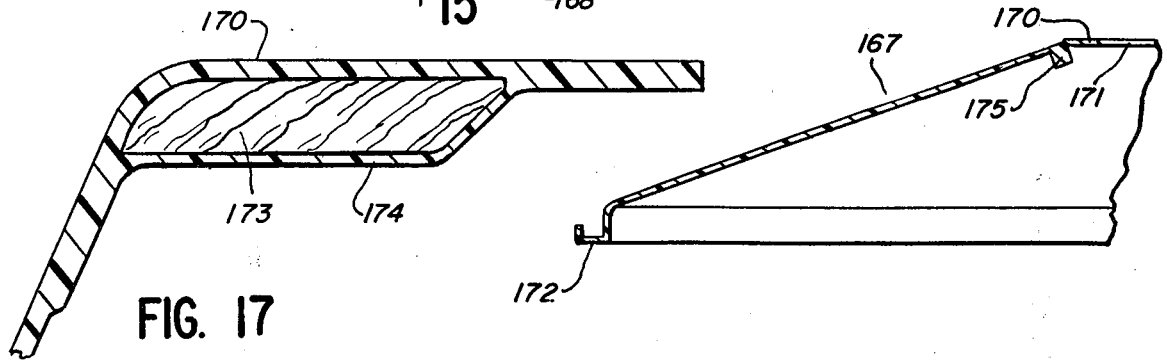
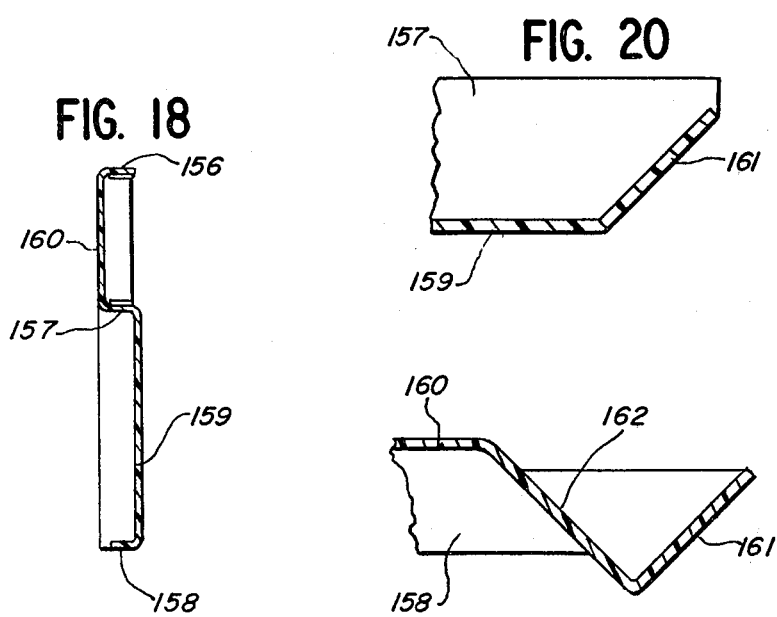
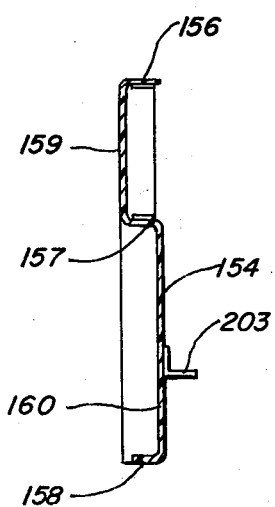

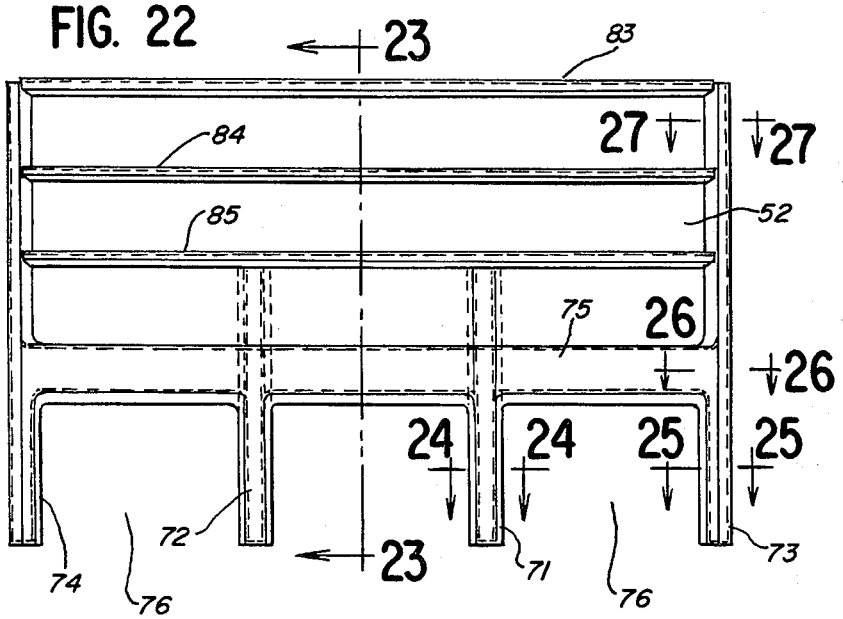
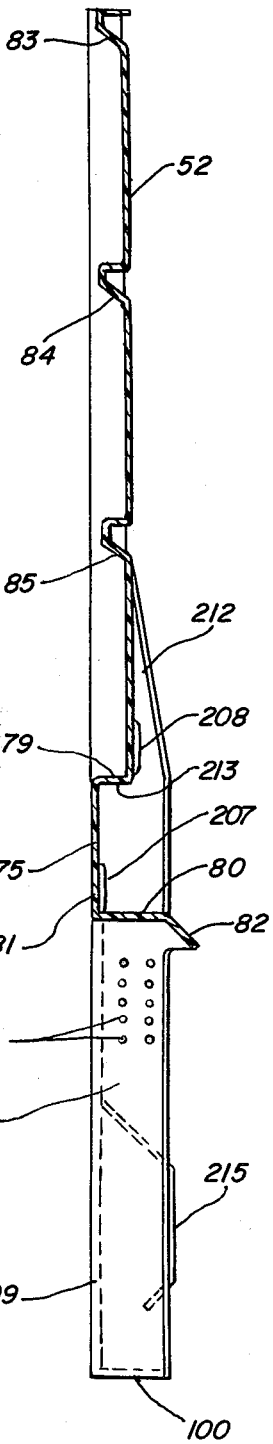
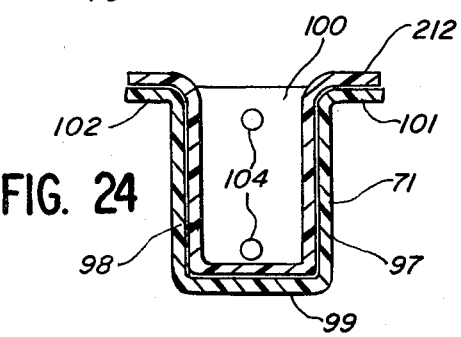
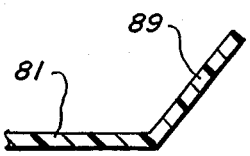
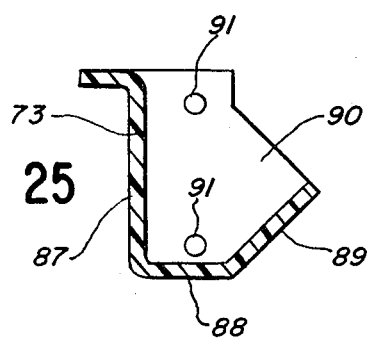
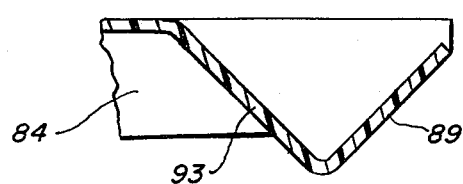

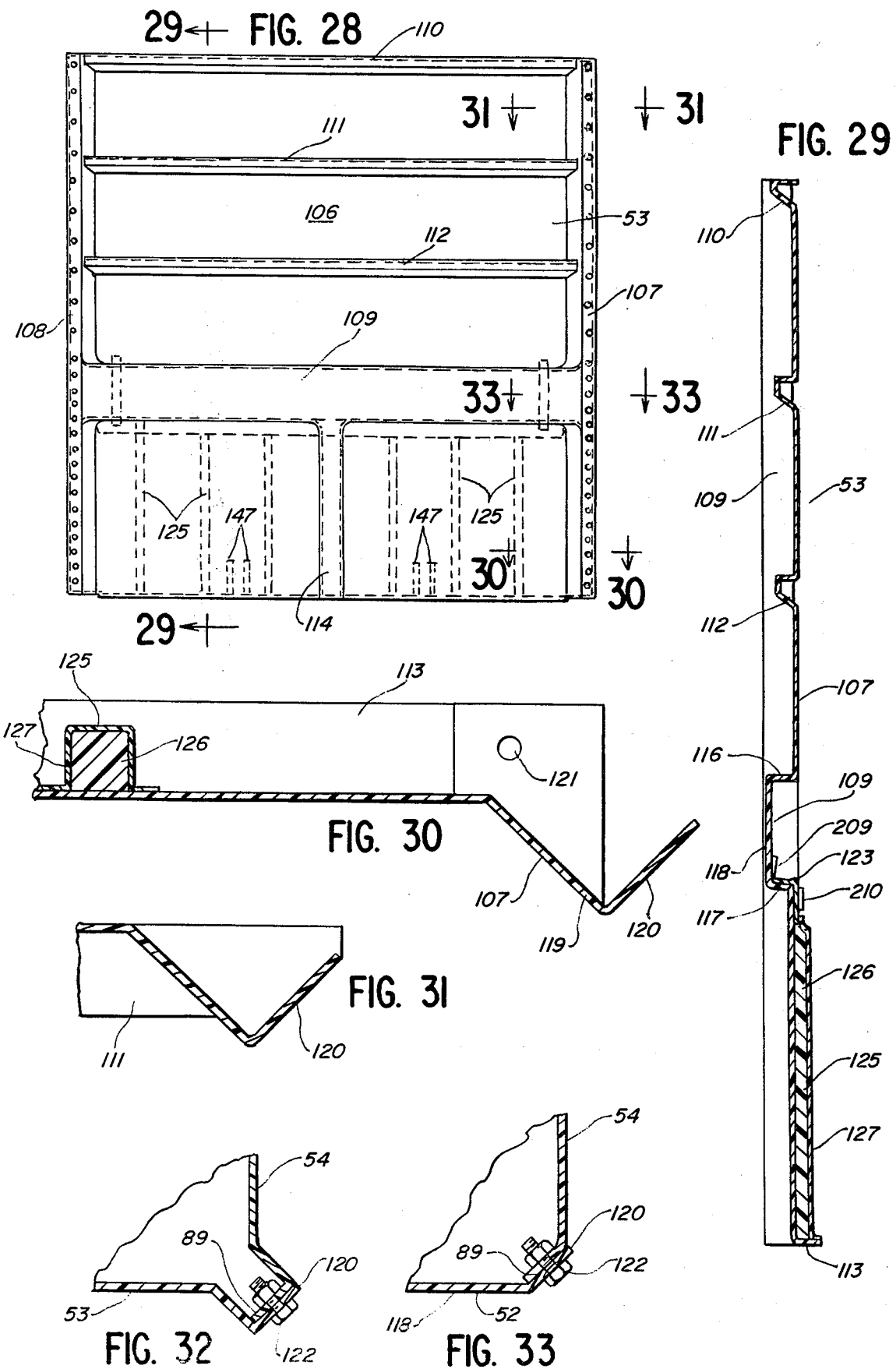

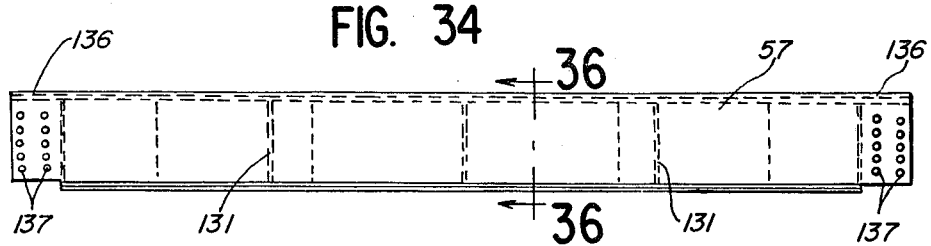
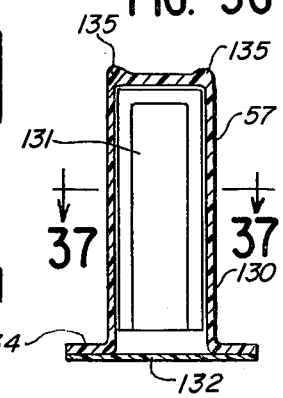
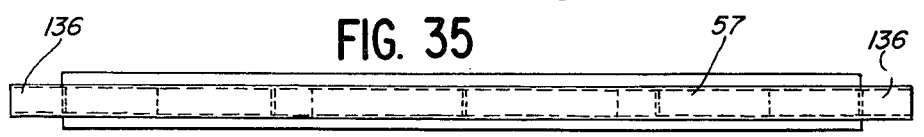
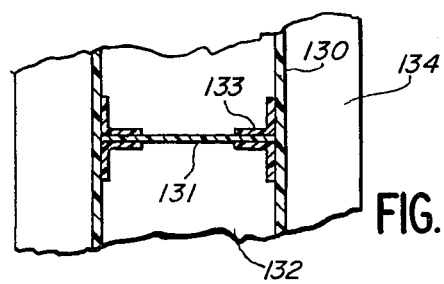
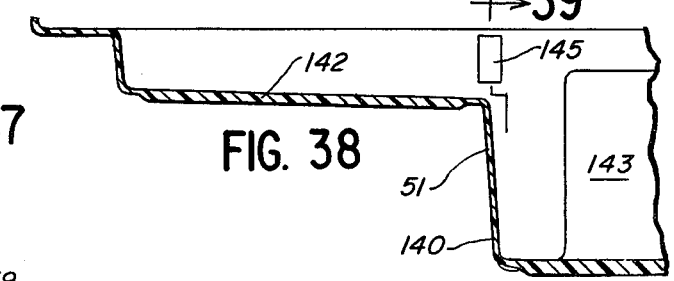
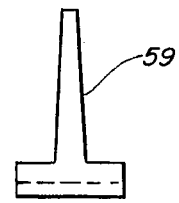
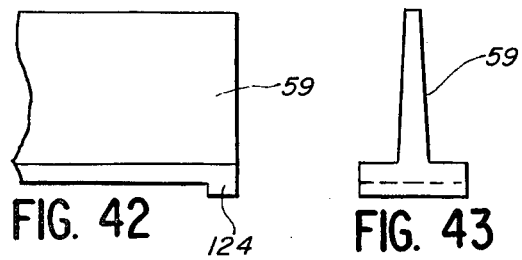
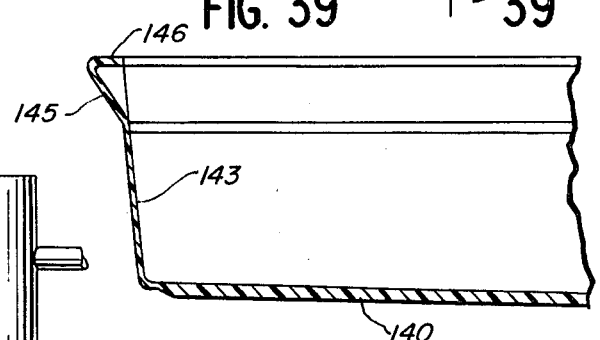
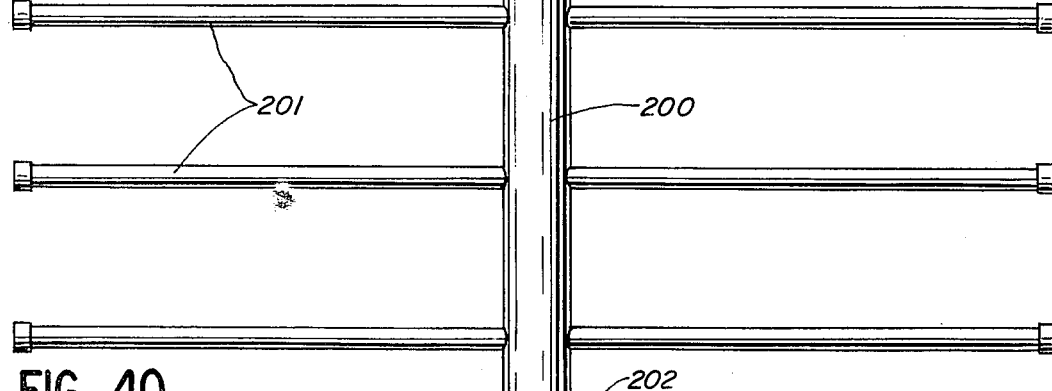
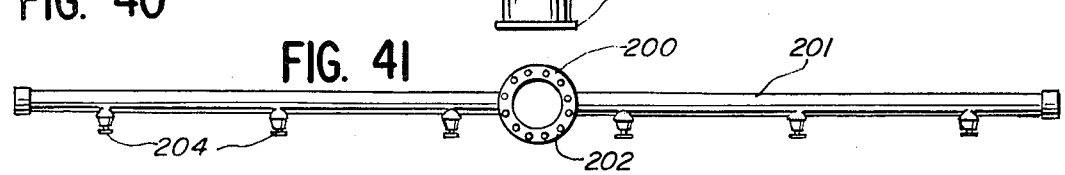

FIG. 44
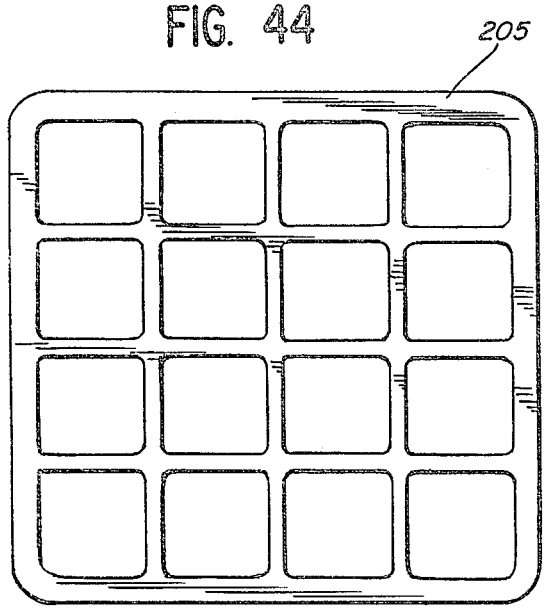
FIG. 45
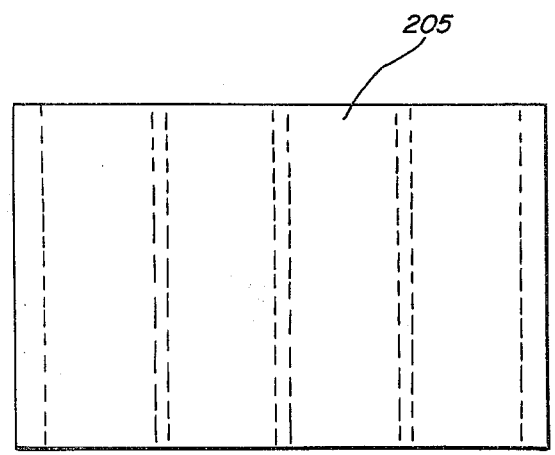
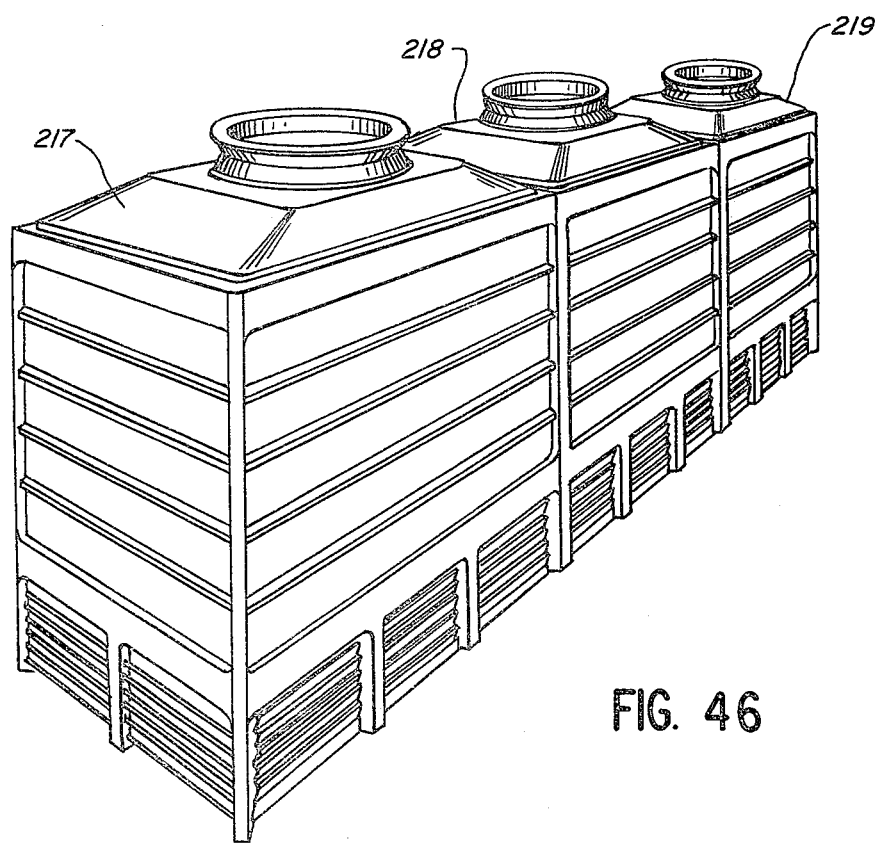
FIG. 46

4,422,983

FIBERGLASS REINFORCED COOLING TOWER

BACKGROUND AND SUMMARY

This invention relates to liquid cooling towers, and, more particularly, to a liquid cooling tower which is formed from fiberglass reinforced polyester resin panels.

Cooling towers are used to cool liquid by contact with air. The liquid is allowed to flow downwardly through the tower, and a counter current flow of air is drawn through the falling liquid by various means. A common application of liquid cooling towers is for cooling water (dissipating waste heat) used in electrical generating and process plants and industrial and institutional air conditioning systems.

Most cooling towers include a tower structure which encloses a fill material. The fill material has spaces through which the liquid flows downwardly and the air flows upwardly to provide heat and mass transfer between the liquid and the air. The tower structure may be formed from concrete, metal, or other material.

Metal parts of cooling towers can be corroded by the local atmosphere and/or the liquid which is being cooled. Concrete is very durable, but concrete towers are expensive and heavy. Many cooling towers are located on roofs of buildings, and the weight of a concrete cooling tower can cause building design problems.

Plastic parts are resistant to corrosion, but plastic parts ordinarily would not provide enough strength to support the fill material and the weight of the tower itself. One well known type of fill material which is used by Ceramic Cooling Towers of Forth Worth, Tex. consists of stacked layers of open-celled clay tiles. This fill material can weigh 60,000 to 70,000 pounds for a conventional size air conditioning cooling tower. Plastic structural parts of a cooling tower must not only support the weight of the fill material but must also resist wind forces and should be designed to withstand earthquake loads. We are not aware of any cooling towers whose structural parts are formed completely of plastic.

According to the invention, a cooling tower is formed from fiberglass reinforced polyester resin panels and beams. All of the structural parts of the tower are fiberglass reinforced plastic except the cast iron lintels which are used to support the fill material and stainless steel bolts which connect the fiberglass reinforced polyester parts. The panels are formed to distribute the load of the tower, the fill material, and the liquid basin to the corners and inlet columns of the tower, and the panels are reinforced with unidirectional glass fibers in critical areas to provide sufficient structural strength. A fan is positioned within a fan shroud in the top of the tower, and the fan and fan motor are supported by the shroud. Since the fan and the shroud move together if the motor vibrates, the clearance between the fan and the shroud can be minimized, thereby increasing the efficiency of the tower.

DESCRIPTION OF THE DRAWING

The invention will be explained in conjunction with an illustrative embodiment shown in the accompanying drawing, in which

FIG. 3 is a sectional view of the top assembly;

FIG. 4 is an exploded sectional view of the top assembly;

FIG. 5 is a perspective view showing the assembly of the tower after two side panels and two cross beams have been erected;

FIG. 6 is a perspective view showing a subsequent stage in erecting the tower;

FIG. 7 is a perspective view of the liquid basin;

FIG. 8 is a fragmentary perspective view showing the tower being filled with fill material;

FIG. 8A is an enlarged fragmentary perspective view of the end of a support lintel and a pair of clay tiles;

FIG. 9 is a fragmentary sectional view of the fan shroud taken along the line 9—9 of FIG. 4;

FIG. 10 is an enlarged fragmentary sectional view of a portion of FIG. 4;

FIG. 11 is a top plan view of the fan support spider;

FIG. 12 is a sectional view taken along the line 12—12 of FIG. 11;

FIG. 13 is a sectional view taken along the line 13—13 of FIG. 11;

FIG. 14 is a top plan view of the fan deck;

FIG. 15 is a fragmentary sectional view taken along the line 15—15 of FIG. 14;

FIG. 16 is a fragmentary sectional view taken along the line 16—16 of FIG. 14;

FIG. 17 is an enlarged fragmentary sectional view taken along the line 17—17 of FIG. 14;

FIG. 18 is an enlarged sectional view of one of the top panels shown in FIG. 4;

FIG. 19 is a sectional view of one of the top panels taken along the line 19—19 of FIG. 4 showing the header support flange;

FIG. 20 is a sectional view of the corner portion of one of the top panels taken along the line 20—20 of FIG. 2;

FIG. 21 is a sectional view of the corner portion of one of the top panels taken along the line 21—21 of FIG. 2;

FIG. 22 is a side elevational view of one of the side panels;

FIG. 23 is a sectional view of the side panel taken along the line 23—23 of FIG. 22;

FIG. 24 is a sectional view taken along the line 24—24 of FIG. 22;

FIG. 25 is a sectional view of the corner portion of the side panel taken along the line 25—25 of FIG. 22;

FIG. 26 is a sectional view of the corner portion of the side panel taken along the line 26—26 of FIG. 22;

FIG. 27 is a sectional view of the corner portion of the side panel taken along the line 27—27 of FIG. 22;

FIG. 28 is an elevational view of one of the other side panels;

FIG. 29 is a sectional view taken along the line 29—29 of FIG. 28;

FIG. 30 is a fragmentary sectional view of the corner portion of the side panel taken along the line 30—30 of FIG. 28;

FIG. 31 is a fragmentary sectional view of the corner portion of the side panel taken along the line 31—31 of FIG. 28;

FIG. 32 is a sectional view showing the corner portions of two adjacent side panels joined together as would be seen along the line 32—32 of FIG. 1;

FIG. 33 is a sectional view showing the corner portions of two adjacent side panels joined together as would be seen along the line 33—33 of FIG. 28;

FIG. 34 is a side elevational view of one of the cross beams;

FIG. 35 is a top plan view of the cross beams;

FIG. 36 is an enlarged sectional view taken along the line 36—36 of FIG. 34;

FIG. 37 is a sectional view taken along the line 37—37 of FIG. 36;

FIG. 38 is a fragmentary sectional view of the liquid basin;

FIG. 39 is a fragmentary sectional view of the liquid basin taken along the line 39—39 of FIG. 38;

FIG. 40 is a top plan view, partially broken away, of the liquid distribution assembly;

FIG. 41 is a side elevational view of the liquid distribution assembly;

FIG. 42 is a fragmentary side elevational view of one of the support lintels for the fill material;

FIG. 43 is an end elevational view of the support lintel;

FIG. 44 is an enlarged top plan view of one of the clay tiles which comprise the fill material;

FIG. 45 is a side elevational view of the clay tiles;

FIG. 46 is a perspective view showing a plurality of modular cooling towers joined to provide a large capacity tower;

DESCRIPTION OF SPECIFIC EMBODIMENT

Figure 1:
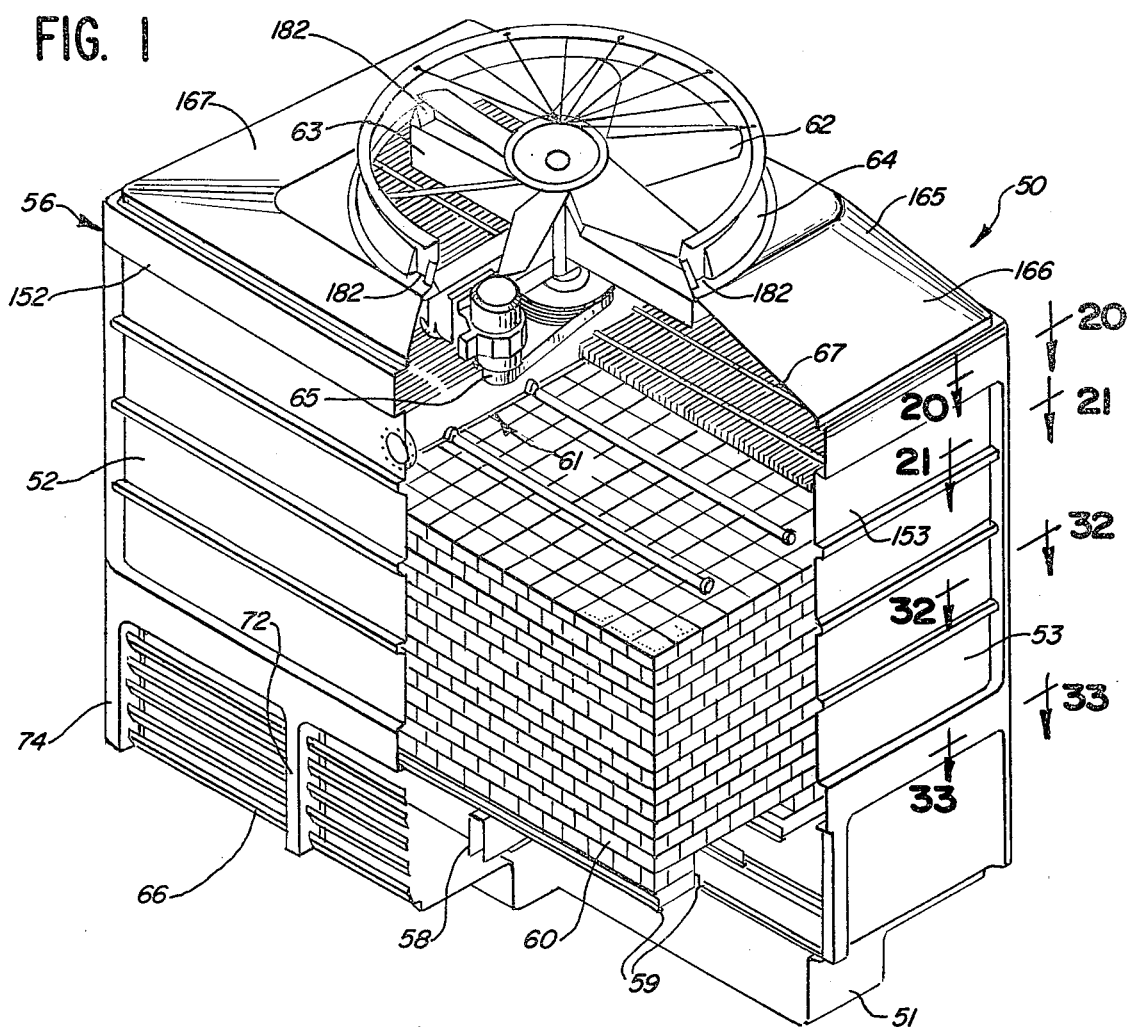
FIG. 1 is a perspective view, partially broken away, of a cooling tower formed in accordance with the invention.

Referring first to FIG. 1, the numeral 50 designates generally a mechanical draft type of cooling tower which is used for cooling water for an air conditioning system. The cooling tower includes a liquid basin 51 at the bottom of the tower, four vertically extending side panels 52, 53, 54, and 55 (see also FIG. 6) and a top assembly 56 (see also FIGS. 2 and 3). A pair of cross beams 57 and 58 (FIG. 5) extend between the side panels 52 and 54, and a plurality of cast iron support lintels 59 (FIG. 8) are supported by the cross beams and by the side panels 53 and 55. The lintels support the fill material of the tower, which is generally designated by the numeral 60 in FIG. 1.

The top assembly includes a liquid distribution assembly 61 for feeding the liquid which is to be cooled to the top of the fill material and a fan 62 for drawing air through the fill material countercurrently with the flow of liquid. The fan is mounted in a spider support 63 which is attached to a generally cylindrical fan shroud 64, and the fan is driven by a motor 65 which is also mounted on the spider. Air is drawn through the bottom of the fill material from outside of the cooling tower through louvers 66 which are mounted in the side panels 52 and 54. A drift eliminator assembly 67 is positioned between the fan and the liquid distribution assembly 61. The drift eliminator assembly is intended to permit air to flow upwardly there through but to impede the water. The particular drift eliminator shown in the drawing uses three layers of angled slots to form a zig-zag path. Another type of drift eliminator which could be used includes a plurality of spaced-apart air-foil shaped vanes.

Each of the side panels 52–55 is formed from fiberglass reinforced polyester resin. The outer surface of each side panel preferably includes a protective gel coat, and the panel can be formed by spraying a mold with a conventional gel coat, laying glass fibers over the gel coat, and applying a conventional polyester resin. The fiberglass is preferably woven roving, and, as will be explained more fully hereinafter, portions of the side panels are reinforced with unidirectional fiberglass to provide additional structural strength in certain critical areas.

The side panels 52 and 54 are made from the same mold. Referring to FIGS. 2, 5, and 22–26, each of these panels includes a main panel portion 70, a pair of generally channel-shaped legs 71 and 72, and a pair of corner posts 73 and 74. The legs and the corner posts extend downwardly from a horizontally extending generally channel-shaped beam section or box section 75 which extends across the entire length of the panel and which merges into the corner posts. The panel is recessed between the corner posts 73 and 74 and the legs 71 and 72 to provide air intake openings 76.

Referring to FIG. 23, the beam 75 includes upper and lower ledges 79 and 80 and a central portion 81. The lower ledge terminates in a downwardly and inwardly extending lip 82 which directs water away from the air openings.

The upper end of each side panel 52 and 54 terminates in a horizontally extending reinforcing rib or channel 83. A pair of reinforcing ribs 84 and 85 extend parallel to the upper rib and to the beam 75.

Referring to FIG. 25, each corner post includes an outwardly extending side wall 87, an outer wall 88, and an angled corner wall 89 which extends at about 45° with respect to the plane of the wall 88. A bottom wall 90 at the bottom of the post is provided with bolt holes 91 for bolting the post to an I beam, concrete curb, etc. which supports the tower.

Referring now to FIG. 26, each lateral end of the beam 75 terminates in an angled corner wall 89 which is a continuation of the angled corner wall 89 of the corner post. FIG. 27 shows that each lateral end of the upper portion of the side panels 52 and 54 terminates in an L-shaped wall 93 which includes an angled corner portion 89 which is a continuation of the angled corner wall 89 of the beam. A continuous angled wall is thereby provided at each corner of the cooling tower which extends at about 45° with respect to the two adjacent side panels of the cooling tower and which can be connected to a similar angled wall on the adjacent panel to provide the cooling tower with generally channel-shaped corners. This will be explained more fully hereinafter.

As can be seen in FIG. 24, each channel-shaped leg 71 and 72 includes a pair of parallel side walls 97 and 98, an outer wall 99, and a bottom wall 100. The side walls terminate in laterally flared flanges 101 and 102. The bottom wall 100 is provided with bolt holes 104 for bolting the leg to a supporting I beam or curb. The side walls 97 and 98 of the legs merge smoothly with the lower ledge 80 of the beam 75, and the outer wall 99 is flush with the outer wall 81 of the beam (see FIG. 23).

Each of the side panels 53 and 55 (FIGS. 28–31) are made from the same mold. The side panels 53 and 55 are somewhat narrower than the side panels 52 and 54, and the cooling tower is therefore rectangular. However, the lengths of the side panels can vary depending upon the cooling capacity which is required. The side panels 53 and 55 are formed in generally the same manner as the side panels 52 and 54. One difference is that in the embodiment illustrated the side panels 53 and 55 are not provided with air inlet openings.

Each side panel 53 and 55 includes a main panel portion 106 and a pair of vertically extending corner portions 107 and 108. A horizontally extending channel-shaped beam section 109 and horizontally extending reinforcing ribs or channels 110, 111, and 112 extend between the corner portions. The bottom of the side panel terminates in an inwardly extending flange 113 (FIG. 29), and a vertically extending reinforcing channel 114 (FIG. 28) extends between the bottom of the panel and the beam 109. The beam 109 includes upper and lower ledges 116 and 117 (FIG. 29) and an outer wall 118.

The shape of the corner posts 107 and 108 below the beam 109 is shown in FIG. 30. Each corner post includes an L-shaped wall 119 which includes an angled corner wall 120 which extends at 45° with respect to the two adjacent side panels at the corner. The bottom flange 113 is provided with a bolt hole 121. The corner post has the same configuration above the beam 109, as shown in FIG. 31. FIG. 33 shows the shape of the corner post where the beam 109 merges with the corner. The outer wall 118 of the beam merges directly into the angled corner wall 120.

The angled corner wall 120 extends for the entire height of the side panels 53 and 55 along each side edge thereof, and each angled corner wall of the side panels 53 and 55 overlaps an angled corner wall 89 of one of the side panels 52 and 54 as shown in FIGS. 32 and 33. FIG. 32 illustrates the cross section of the corner of the cooling tower at the section 32—32 of FIG. 1, and FIG. 33 illustrates the corner at the section 33—33 of FIG. 1. The two corner walls 89 and 120 are connected by stainless steel bolts 122 which are spaced apart about 5 or 6 inches. The corners of the cooling tower above and below the beam sections 75 and 109 of the side panels therefore have the shape of a channel-shaped beam.

Returning to FIG. 29, the lower ledge 117 of the beam 109 is provided with an upwardly raised ridge or lip 123, which may be formed from glass fibers and resin. A plurality of cast iron support lintels 59 (FIGS. 8 and 8A) are supported at one end by the lower ledge 117 and at the other end by one of the cross beams 57 and 58. Referring to FIGS. 8A, 42, and 43, each lintel has an inverted T shape, and each end of the lintel includes a downwardly extending flange 124. The flange 124 is engageable with the lip 123 on the ledge 117 to prevent the end of the lintel from being withdrawn from the ledge.

A reinforcing bar or stiffener 125 (FIGS. 28 and 30) is secured to the side panels 53 and 55 below each of the lintels. The stiffener 125 includes a core 126 of polyurethane foam and an outer skin 127 of fiberglass reinforced polyester resin which is joined to the resin of the panel.

The cross beams 57 and 58 are formed completely from fiberglass reinforced polyester resin. Each beam includes an inverted channel-shaped wall 130 (FIG. 36), a plurality of bulkheads or panels 131, and a bottom wall 132. As shown in FIG. 37, each bulkhead is secured by L-shaped strips 133 of resin-impregnated fiberglass. The bottom wall 132 is joined to outwardly flared flanges 134 on the top wall.

A bulkhead is positioned within the beam at each point at which the beam supports one of the cast iron lintels 59. The top of the beam includes a pair of raised longitudinally extending lips or ridges 135 (FIG. 36) which are engageable with the ledges 117 at the ends of the lintels to prevent the lintels from being withdrawn from the beam. The beams are preferably molded with a slight upward camber from the ends toward the middle so that when the beams are deflected downwardly by the weight of the fill material, the beams are horizontal.

The bottom wall 132 and the flanges 134 terminate short of each end of the beam to provide attaching portions 136 (FIGS. 34 and 35) which are provided with bolt holes 137. The attaching portions of the beams fit into the channel-shaped legs 71 and 72 (FIG. 5) of the side panels 52 and 54, and the legs are also provided with bolt holes or pin holes 138 (FIG. 23). The beams are secured to the legs by stainless steel pins. The louvers 66 (FIG. 1) extend between the legs 71 and 72 and the corner posts 73 and 74 and fit into slots in the channel-shaped insert that attaches to legs and posts.

The liquid basin 51 (FIGS. 1, 2, 7, 38, and 39) is molded from fiberglass reinforced polyester resin. The particular basin illustrated includes a central trough (FIG. 7), a pair of side portions 141 and 142 which are inclined toward the central trough, and a pair of end walls 143 and 144. The edges of the side portions extend under the side panels 52 and 54 and direct water which drips from the fill material to the trough.

Each of the end walls of the basin is molded with a pair of bathtub-type projections 145 (FIGS. 38 and 39) which provide a top attaching flange 146 which is reinforced by the triangular sides of the projection. A bolt hole is provided in each attaching flange, and the basin is attached to the side panels 53 and 55 by bolts which extend through the bottom flange 113 of the side panels. Referring to FIG. 28, the side panels and the bottom flange can be reinforced in the area of the bolt holes by a pair of triangular shaped gusset plates 147 of resin impregnated fiberglass which are attached to the inside surface of the panel and to the bottom flange. The weight of the basin and the liquid therein is transmitted entirely by four bolts, two at each end of the basin, and the bottom of the basin needs no support from the structure on which the cooling tower is built. This is advantageous, for example, when the cooling tower is erected on a rooftop. The weight of the basin is transmitted by the bolts to the side panels 53 and 55, which distribute the load to the corner posts of the panels.

The top assembly 56 includes four top panels 152, 153, 154, and 155 (FIGS. 1-4) which are molded from fiberglass reinforced polyester resin. Each of the top panels has a double-channel cross section (FIGS. 18 and 19) which includes an upper ledge 156, an intermediate ledge 157, a lower ledge 158, and a pair of offset, parallel walls 159 and 160.

FIGS. 20 and 21 show the cross section of the corner portions of the top panels. The wall 159 merges with an angled corner wall 161 (FIG. 20) and the wall 160 merges with a V-shaped portion 162 which includes the angled corner wall 161. The corner walls 161 of the four top panels overlap and are joined by stainless steel bolts in the same manner as the side panels 52-55 are joined.

A fiberglass reinforced polyester resin fan deck 165 (FIGS. 1, 2, and 14-17) is supported by the top panels. The fan deck has an inverted pan shape and includes a pair of gently sloping side walls 166 and 167 which extend upwardly from the top panels 153 and 155, a pair of side walls 168 and 169 which extend upwardly from the top panels 152 and 154 at a greater angle, and a flat top wall 170. The top wall is provided with a central fan opening 171 through which air is exhausted from the cooling tower by the fan.

The bottom of the fan deck terminates in a channel-shaped trough 172, and the fan deck is secured to the top panels by stainless steel bolts which extend through the trough and the top ledges 156 of the top panels. Each of the corner portions of the top wall 170 are reinforced by a polyvinyl foam core 173 (FIG. 17) which is secured to the bottom surface of the fan deck by a layer 174 of resin-impregnated fiberglass. The long side walls 166 and 167 are reinforced by polyvinyl foam bars 175 (FIG. 16) adjacent the top wall.

The fan shroud 64 is molded from fiberglass reinforced polyester resin. The fan shroud is generally cylindrical and includes a circular upper side wall 178 (FIG. 10), a frusto-conical lower side wall 179, and top and bottom radially outwardly extending flanges 180 and 181. The frusto-conical side wall 179 extends inwardly at four locations to provide recessed attaching portions 182 (FIGS. 1, 4, and 9). The bottom flange 181 is attached to the top wall 170 of the fan deck by stainless steel bolts, and the spider 63 (FIG. 1) is attached to the fan shroud by stainless steel bolts which extend through the bottom flange 181 at the recesses 182.

The spider 63 is also formed from fiberglass reinforced polyester resin. Referring to FIGS. 11-13, the spider is cruciform shaped and includes four arms 185, 186, 187, and 188. Each arm is tubular and includes an inverted U-shaped upper wall 189 and a bottom wall 190. The arm 185 supports the fan motor 65 and includes a lower U-shaped wall 192. One side of the walls 189 and 192 of the arm 185 projects outwardly to form mounting bases 193 and 194 for the fan motor.

The arm 185 is reinforced with three vertical bulkheads 195, the arms 186, 187, and 188 are reinforced with two bulkheads. The outer end of each arm is provided with a flat attaching portion 196 which is provided with bolt holes for attaching the spider to the recessed portions of the fan shroud. The shaft of the fan extends through an opening 197 in the center of the spider, and the fan is driven by the fan motor through a belt and pulley.

The spider, fan, and fan motor are attached only to the fan shroud, and the entire weight of the spider, fan, and fan motor is supported by the shroud. Accordingly, any vibration of the motor which causes the fan to vibrate will also cause the shroud to vibrate. Since the fan and shroud vibrate together, the clearance between the fan blades and the shroud can be reduced to a minimum, thereby increasing the efficiency of the fan in drawing air through the cooling tower.

The water distribution assembly 61 includes a large diameter header pipe 200 (FIGS. 3, 40, and 41) and a plurality of lateral pipes 201 which extend transversely outwardly from the header pipe. One end of the header pipe is equipped with a flange 202 which is bolted around an opening in the top panel 152 (FIG. 1). The other end of the header is supported by an angle 203 (FIGS. 4 and 19) which is formed from resin-impregnated fiberglass. The header 200 and the laterals are preferably molded from fiberglass reinforced polyester resin, and a plurality of spray nozzles 204 are mounted on the laterals. The drift eliminator panels 67 are simply laid over the laterals and supported thereby.

The liquid which is to be cooled is pumped to the header and is sprayed over the fill material. As the liquid falls through the fill material, air is drawn upwardly through the fill material by the fan. The cooled liquid is collected by the basin 51, where it is pumped back to the air conditioner or other apparatus which is to be cooled.

The preferred form of fill material is illustrated in FIGS. 8A, 44 and 45 and consists of stacked layers of open-celled clay tiles 205. Each tile is generally rectangular in cross section and is provided with a plurality of axially extending cells or open spaces. The rectangular tiles may have transverse dimensions of about 9 to 10 inches, an axial length of about 5 to 8 inches, and about 2 to 5 cells on each side. If desired, the layers of tiles may be separated by spacers as described in the co-owned U.S. Pat. application entitled "Water Cooling Tower with Layers of Multi-Cell Tiles and Spacers", Ser. No. 304,695, filed Sept. 22, 1981, now U.S. Pat. No. 4,382,046.

The cooling tower is assembled by bolting the legs 71 and 72 and the corner posts 73 and 74 of the two side panels 52 and 54 to a pair of I beams 206 (FIG. 5), concrete curbs, or other support structure. The cross beams 57 and 58 are bolted to the panels, and the side panels 53 and 55 are then bolted to the I beams and to the panels 52 and 54 (FIG. 6). The liquid basin 51 is then bolted to the side panels 53 and 55. As explained previously, the liquid basin is supported entirely by the side panels, and the bottom of the basin may be spaced upwardly from the surface on which the I beams rest. The lintels 59 are then positioned, and the fill material is stacked on the lintels. Although the other structural parts of the tower are formed from fiberglass reinforced plastic, the lintels are cast iron in the preferred embodiment. Even though cast iron does form an oxide film, it is generally self-protecting and cast iron lintels have proven to be extremely durable and reliable for supporting the clay tiles which are the preferred fill material.

Figure 2:
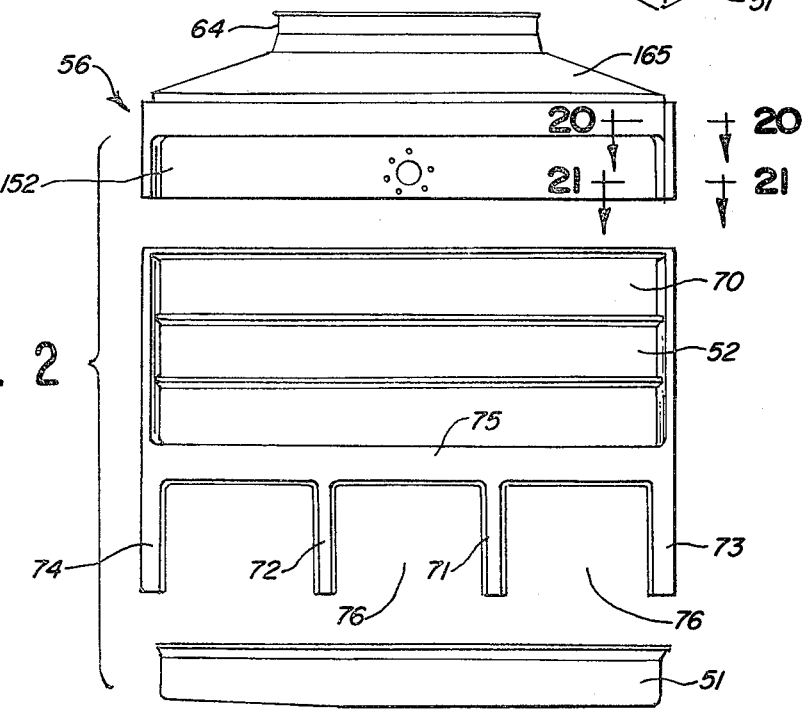
FIG. 2 is an exploded side view of the liquid basin, one side panel, and the top assembly.

The top assembly is preferably assembled as a unit as shown in FIGS. 2 and 3 before it is mounted on the side panels. The modular nature of the top assembly reduces the cost and time needed to assemble the cooling tower at the erection site.

The channel-shaped beams, corners, and legs of the various panels provide structural strength and help to distribute the load of the tower and the fill material to the four corners of the cooling tower. The entire load of the cooling tower is supported by the four corners and the two legs 71 and 72 of the side panels 52 and 54. The shape of the panels also resists wind loads and earthquake loads and distributes these loads to the corners.

We have found it desirable to reinforce portions of the tower with unidirectional glass fibers to strengthen the tower and to help to direct the loads to the corners. The unidirectional glass fibers are impregnated with resin and laid over the molded fiberglass reinforced polyester resin structure. A layer 207 (FIG. 23) of unidirectional fiberglass is attached to each of the side panels 52 and 54 along the wall 81 of the beam 75 adjacent the bottom ledge 80, and a layer 208 is attached just above the ledge 79. The layers extend for the length of the panel, and the fibers extend horizontally. Horizontally extending layers 209 and 210 (FIG. 29) of unidirectional fiberglass are attached to the side panels 53 and 55 above and below the lower edge 117 of the beam 109. A vertically extending layer is attached to the outside surface of each of the reinforcing bars 125 of the panels 53 and 55, and a horizontally extending layer is attached to the bottom flange 113.

Horizontally extending layers of unidirectional fiberglass are attached to the top of each of the cross beams 57 and 58 and to the top surfaces of the flanges 134. The roven woving which is used to mold the cross beam is laid down so that the glass fibers in the middle portion of the side walls of the beam extend horizontally and vertically and the glass fibers in the end portions extend at a 45° angle with respect to the horizontal. The middle of the beam is subjected to compression and tension loads, and the end portions are subjected to shear loads.

The top panels 152-155 are reinforced by horizontally extending layers of unidirectional fiberglass attached to the bottom surface of the ledge 156 (FIG. 18) and to the top surface of the ledge 157. The side panels 166 and 167 of the fan deck are reinforced by unidirectional fiberglass which extends from the top wall to the trough in the middle of each side panel and by a layer which extends along the bottom of the bar 175 (FIG. 16). The spider 63 is reinforced by layers which extend longitudinally along the top and bottom of each arm.

Figure 47:
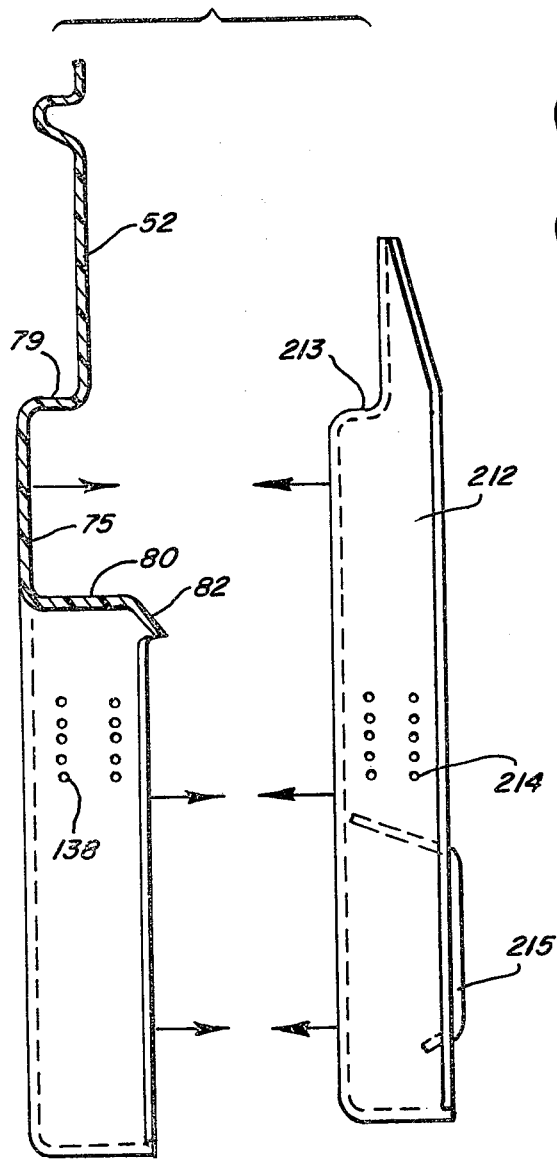
FIG. 47 is a fragmentary exploded sectional view of the side panel and channel-shaped insert of FIG. 23.

In order to distribute loads from the beam 75 of the side panels 52 and 54 to the legs 71 and 72, a channel-shaped insert or liner 212 (FIGS. 23, 24, 47, and 48) is inserted into each leg. The insert extends upwardly into the beam 75, and a shoulder 213 on the insert abuts the upper ledge 79 of the beam. The liner is molded from fiberglass reinforced polyester resin and is secured within the leg by resin. The ends of the cross beams are positioned within the liners, and the liners are provided with bolt holes 214 (FIG. 47) which are aligned with the bolt holes 138 in the legs. A reinforcing member or stiffener 215 is secured within the liner.

Three right angle loads intersect where the cross beams are attached to the legs—the loads of the cross beams, the beam 75, and the legs. It is difficult to reinforce fiberglass structures in areas where loads intersect at right angles because fiberglass cannot transmit loads around corners. The liner, which extends vertically past the corner beam intersection and then past the front and rear wall horizontal beam, is the key design solution to this difficult problem. The liner is in reality a stiff beam-column able to transmit loads out of the critical intersection, in either direction, up or down.

Figure 48:
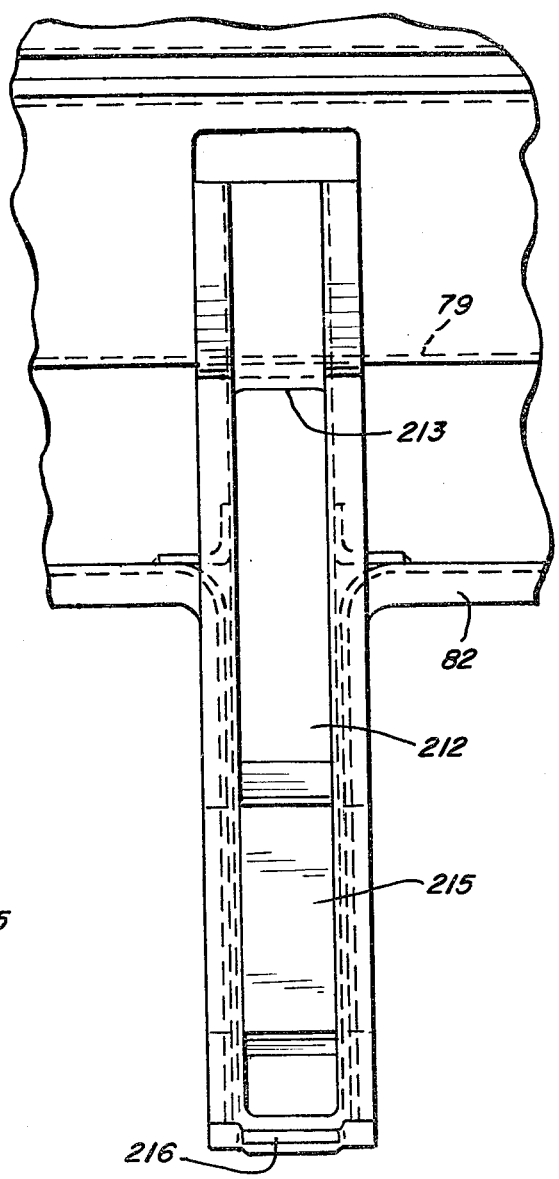
FIG. 48 is a fragmentary elevational view of the assembled side panel and insert of FIG. 47.

The space between the bottom of each liner and the corresponding panel leg is filled with reinforced fiberglass putty 216 (FIG. 48). The putty provides strength to resist local stresses, particularly when the supporting concrete or I beam is not level. The putty acts as a rigid cushion to redistribute the load.

The fiberglass reinforced plastic parts of the cooling tower permit the tower to be assembled in modular form and enables the capacity of the cooling tower to be increased simply by adding additional modules. Referring to FIG. 46, three modules 217, 218, and 219 are joined to provide a cooling tower having a capacity of three times the capacity of a single modular. Each module is formed as previously described, except that a common end wall may be used between adjacent modules.

While in the foregoing specification a detailed description of a specific embodiment of the invention was set forth for the purpose of illustration, it will be understood that many of the details herein given may be varied considerably by those skilled in the art without departing from the spirit and scope of the invention.

We claim:

1. A liquid cooling tower comprising four generally rectangular vertically extending side panels formed of fiberglass reinforced polyester resin, the four side panels being arranged in two pairs of opposed parallel panels to provide a generally rectangular enclosure, at least one support beam extending generally between one pair of opposed side panels and secured thereto, each support beam being formed of fiberglass reinforced polyester resin, a plurality of lintels extending generally perpendicularly to the support beam, means on the other pair of opposed side panels for supporting the lintels, each end of each lintel being supported by either a support beam or by the lintel support means of a side panel, porous means for heat/mass exchange within said enclosure and supported by the lintels for permitting air and liquid to pass through the exchange means, a top portion supported by the side panels and having an air opening therein, a fan in the air opening supported by the top portion, and liquid distribution means within the enclosure for supplying liquid to the exchange means.

2. The cooling tower of claim 1 including a liquid basin below the side panels, the liquid basin being supported by two of the opposed side panels.

3. The cooling tower of claim 2 including a pair of bolts extending through each of said two opposed side panels and through the liquid basin for supporting the liquid basin, said bolts providing the sole support for the liquid basin.

4. The cooling tower of claim 1 in which each of the panels of said one pair of opposed side panels includes at least one vertically extending channel-shaped leg portion, said support beam being positioned within said leg portions and being bolted thereto.

5. The cooling tower of claim 4 in which each of the panels of said one pair of opposed side panels is formed with a generally horizontally extending channel-shaped box section above said leg portion for reinforcing the panel.

6. The cooling tower of claim 5 including a vertically extending channel-shaped liner positioned within each of said leg portions and extending upwardly beyond the box section above the leg portion, said support beam being positioned within said liner.

7. The cooling tower of claim 1 in which each of the panels of said other pair of side panels is formed with a generally horizontally extending channel-shaped box section having a lower ledge, said lower ledge providing said lintel support means.

8. The cooling tower of claim 7 including vertically extending stiffeners attached to each of the panels of said other pair of side panels below said lower ledge.

9. The cooling tower of claim 8 in which one of said stiffeners is positioned below each lintel which is supported by said lower ledge.

10. The cooling tower of claim 8 in which stiffeners are formed from polyurethane foam, fiberglass reinforced resin, and unidirectional fiberglass.

11. The cooling tower of claim 1 in which each end of each of said side panels includes a vertically extending corner portion which is generally L-shaped in horizontal cross section, the corner portions of adjacent side panels being connected together to form a vertically extending corner beam having a channel-shaped horizontal cross section.

12. The cooling tower of claim 1 in which said support beam has a generally rectangular transverse cross section and includes a plurality of transversely extending bulkheads.

13. The cooling tower of claim 1 in which the top portion includes a fan shroud which provides said air opening and means for supporting the fan, said fan support means being attached to and supported by the fan shroud.

14. The cooling tower of claim 13 including a fan motor mounted on the fan support means.

15. The cooling tower of claim 13 in which the fan support means comprises a spider formed of fiberglass reinforced polyester resin and having a central portion which supports the fan and a plurality of tubular arms which extend radially outwardly from the central portion, each of the arms having at least one transversely extending bulkhead.

16. The cooling tower of claim 15 in which the fan shroud includes a bottom flange and each of the arms of the spider is bolted to the bottom flange.

17. The cooling tower of claim 13 in which the fan shroud is formed of fiberglass reinforced polyester resin.

18. The cooling tower of claim 13 in which the top portion further includes a generally pan-shaped fan deck which is formed of fiberglass reinforced polyester resin and which is supported by the side panels, the fan deck having a central opening, the fan shroud being supported by the fan deck around the central opening.

19. The cooling tower of claim 18 in which the top portion further includes four top panels which are formed of fiberglass reinforced polyester resin, each top panel being supported by and attached to the top of one of the side panels to form a rectangular top enclosure, the fan deck being supported by and attached to the top panels.

20. The cooling tower of claim 19 in which each of the top panels includes a generally horizontally extending channel-shaped box section for reinforcing the panel.

21. The cooling tower of claim 19 in which each end of each of the top panels includes a vertically extending corner portion which is generally L-shaped in horizontal cross section, the corner portions of adjacent top panels being connected together to form a vertically extending corner beam having a channel-shaped horizontal cross section.

22. The cooling tower of claim 21 in which each end of each of the top panels includes a vertically extending corner portion which is generally L-shaped in horizontal cross section, the corner portions of adjacent side panels being connected together to form a vertically extending corner beam having a channel-shaped horizontal cross section, the corner beams of the top panels forming extensions of the corner beams of the side panels.

23. The cooling tower of claim 19 in which the liquid distribution means includes a manifold attached to one of the top panels and extending across the top enclosure to the opposite top panel, and support means on said opposite top panel for supporting the manifold.

24. The cooling tower of claim 23 in which said top panels, fan deck, fan shroud, fan, and manifold are assembled as a modular unit which is detachably connected to the side panels.

25. The cooling tower of claim 1 in which each of the side panels of said one pair of opposed side panels is formed with a generally horizontally extending channel-shaped box section and is reinforced by horizontally extending unidirectional glass fibers above each of the upper and lower ledges.

26. The cooling tower of claim 25 in which each of the side panels of said other pair of opposed side panels is formed with a generally horizontally extending channel-shaped box section having upper and lower ledges and is reinforced by horizontally extending unidirectional glass fibers above and below the lower ledge.

27. The cooling tower of claim 25 in which the top of the cross beam is reinforced by longitudinally extending unidirectional glass fibers.

28. The cooling tower of claim 15 in which the top of each of the arms of the spider is reinforced by longitudinally extending unidirectional glass fibers.

29. The cooling tower of claim 20 in which the box section of each of the top panels is reinforced by longitudinally extending unidirectional glass fibers.

30. The cooling tower of claim 1 in which said support beam has a generally rectangular transverse cross section provided by a top wall and a pair of downwardly extending spaced-apart side walls, each of the side walls terminating in an outwardly extending flange, the upper surfaces of the top wall and the flanges being reinforced by unidirectional fiberglass.

31. The cooling tower of claim 30 in which the side walls of the support beam is formed from roven woving, the strands of the roven woving extending vertically and horizontally in the midportion of the beam and extending at about a 45° angle from the horizontal at the end portions of the beam.

32. A liquid cooling tower comprising four generally rectangular vertically extending side panels formed of fiberglass in two pairs of opposed parallel panels to provide a generally rectangular enclosure, porous means for heat/mass exchange within said enclosure, means for supporting said exchange means for permitting air and liquid to pass through the exchange means, a top portion supported by the side panels and having an air opening therein, a fan in the air opening supported by the top portion, and liquid distribution means within the enclosure for supplying liquid to the exchange means, each end of each of said side panels including a vertically extending corner portion which is generally L-shaped in horizontal cross section, the corner portions of adjacent side panels being connected together to form a vertically extending corner beam having a channel-shaped horizontal cross section.

* * * * *